US012633653B2

(12) United States Patent
Johnson

(10) Patent No.: US 12,633,653 B2
(45) Date of Patent: May 19, 2026

(54) WINDOW MOUNTABLE DIRECTION-FINDING ANTENNA ARRAYS

(71) Applicant: L3Harris Technologies, Inc., Melbourne, FL (US)

(72) Inventor: Terry Johnson, Heath, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 77 days.

(21) Appl. No.: 18/464,594

(22) Filed: Sep. 11, 2023

(65) Prior Publication Data

US 2025/0087875 A1 Mar. 13, 2025

(51) Int. Cl.
*H01Q 1/28* (2006.01)
*H01Q 3/04* (2006.01)

(52) U.S. Cl.
CPC ................ *H01Q 3/04* (2013.01); *H01Q 1/28* (2013.01)

(58) Field of Classification Search
CPC .. H01Q 3/04; H01Q 3/08; H01Q 1/28; H01Q 1/25
See application file for complete search history.

(56) References Cited

U.S. PATENT DOCUMENTS 3,977,004 A 8/1976 Bickel
5,927,648 A 7/1999 Woodland
7,397,429 B2 7/2008 Crain et al.
7,642,974 B2 1/2010 Brady, Jr. et al.
8,059,043 B2 11/2011 Brady, Jr. et al.
9,444,132 B2 9/2016 Stone et al.
10,473,746 B1 11/2019 Rossman et al.
11,953,617 B2 * 4/2024 Teague .................... G01S 13/90
2005/0200526 A1 * 9/2005 Crain ....................... H01Q 1/38 343/705
2016/0212669 A1 * 7/2016 Davis ................. H04B 7/18506
2021/0263139 A1 * 8/2021 Ray ......................... G01S 13/87

FOREIGN PATENT DOCUMENTS

EP 1575128 B1 9/2006
EP 4063893 A1 9/2022

OTHER PUBLICATIONS

Extended European Search Report in European Application No. 24193620.2, dated Mar. 10, 2025, 12 pages.

* cited by examiner

*Primary Examiner* — Awat M Salih
(74) *Attorney, Agent, or Firm* — Edell, Shapiro & Finnan, LLC

(57) ABSTRACT

Direction-finding antenna arrays are positioned adjacent the interior surface of one or more aircraft fuselage windows. Such positioning may be means of a frame or other structure that is non-intrusively positioned on the fuselage interior wall adjacent the window and to which the antenna array is secured. Alternatively, a movable floor-supported installation fixture is selectively movable into position relative to fuselage windows and supports one or more antenna arrays adjacent those windows.

6 Claims, 8 Drawing Sheets

WINDOW MOUNTABLE DIRECTION-FINDING ANTENNA ARRAYS

TECHNICAL FIELD

The present disclosure relates generally to improvements in positioning direction-finding antenna arrays in aircraft and, more particularly, to mounting such arrays without structurally reconfiguring the aircraft.

BACKGROUND

Aircraft-borne direction-finding antenna arrays are typically fixed designs incorporated into or permanently mounted on the aircraft structure at locations, for example, on the wing, under the fuselage or on the sides of the fuselage in fairings. Because of their fixed design approach, these installations are not readily modifiable to accommodate new developments in antenna technology without considerable structural modification to the aircraft. Moreover, such installations are not suitable as add-on systems for aircraft that were originally constructed without their features. In addition to these structural issues, permanent aftermarket installation of these arrays requires rigorous time consuming and costly in situ testing to assure proper functionality.

An object of the present disclosure is to provide an efficient and cost-effective solution to the aforesaid problems by utilizing previously unused spaces proximate the interior surfaces of existing aircraft windows without impacting or disturbing the aircraft structure or design.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In accordance with one aspect of the principles disclosed herein, direction-finding antenna arrays may be removably positioned in abutment with or in close proximity to the interior surface of respective aircraft fuselage windows. Such positioning may be achieved, in one example, by means of a frame or other structure non-intrusively and removably mounted or otherwise positioned on the fuselage interior wall adjacent the window and to which the antenna array in modular form may be secured so as to be removably positioned at the interior surface of the window without reconfiguring the aircraft.

In another example, a movable floor-supported installation fixture can be selectively moved into position relative to one or more aircraft windows. One or more respective direction-finding antenna arrays may be secured to the fixture which is configured to permit the required antenna arrays to be removably placed in abutment with or in close proximity to the interior surface of the windows.

In another aspect the disclosed principles are embodied in a method of deploying a direction-finding antenna array in an aircraft, wherein the array has a predetermined beam pattern establishing a field of view, and wherein the method comprises positioning the antenna array in abutment with or in close proximity to an interior surface of an existing window of the aircraft fuselage such that the beam pattern projects through the window.

In another aspect an apparatus comprises a frame member configured to be positioned proximate a window in an aircraft fuselage, and a direction-finding antenna array is configured to be secured to the frame member in a position in abutment with or in close proximity to the interior surface of the window.

BRIEF DESCRIPTION OF THE DRAWINGS

By way of example, specific illustrative embodiments of the present disclosure will now be described with reference to the accompanying drawings.

DETAILED DESCRIPTION

Figure 1:
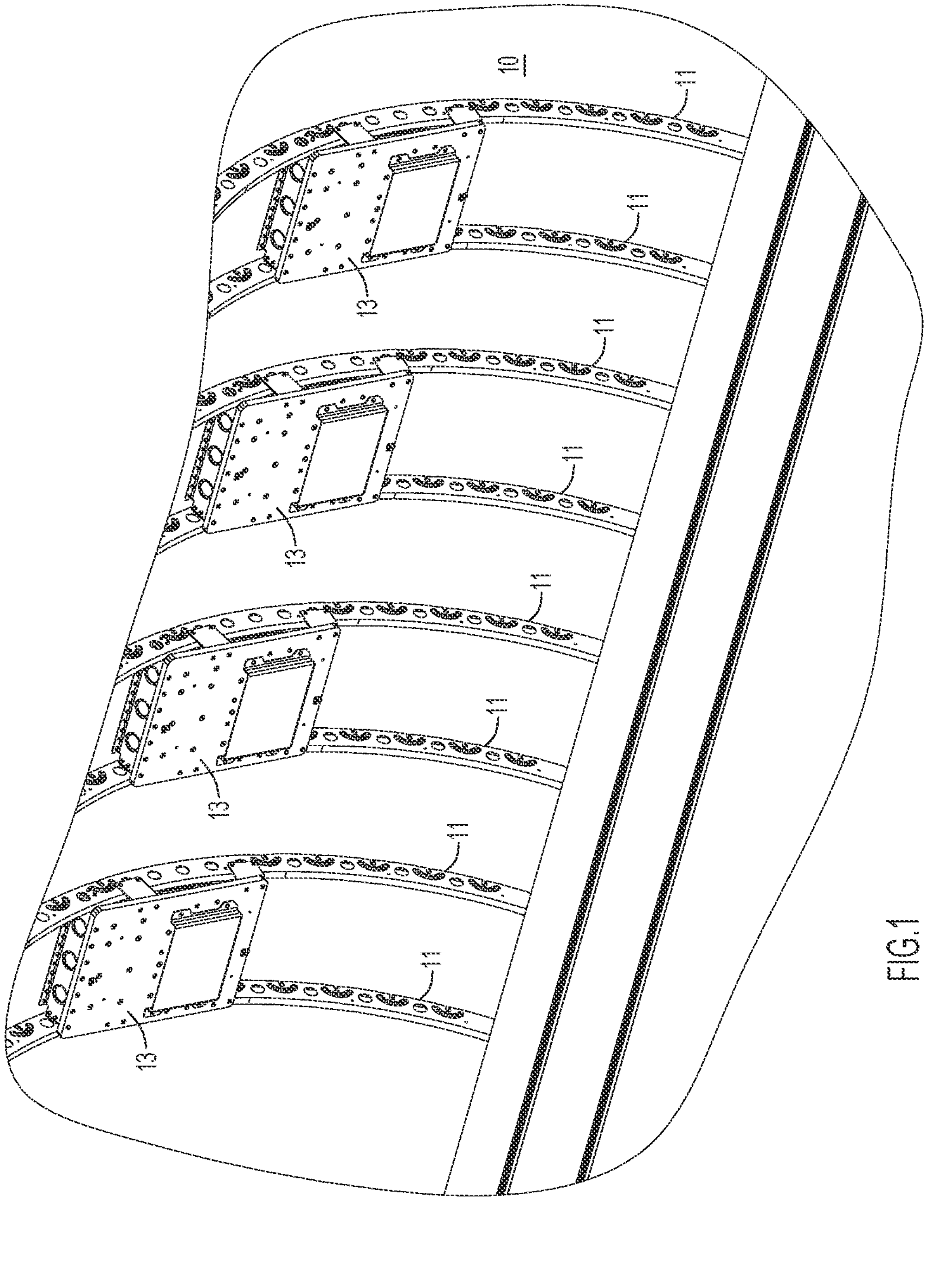
FIG. 1 is a perspective view of a portion of the interior surface of a wall of an aircraft fuselage showing four direction-finding antenna arrays mounted on the fuselage wall proximate the interior surfaces of respective windows.

The present system and methods are described more fully hereinafter with reference to the accompanying drawings, in which several exemplary embodiments are shown. It will be readily understood that the components of the embodiments as generally described herein and illustrated in the appended drawings may be arranged and designed in a wide variety of different configurations. Thus, the following more detailed description of various embodiments, as represented in the drawings, is not intended to limit the scope of the present disclosure but is merely representative of various embodiments. While the various aspects of the embodiments are presented in the drawings, the drawings are not necessarily drawn to scale unless specifically indicated.

The subject matter disclosed herein may be embodied in other specific forms without departing from its spirit or essential characteristics; that is, the described embodiments are to be considered in all respects only as illustrative and not restrictive. The scope of the invention(s) is/are, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the disclosed apparatus, system and method should be or are in any single embodiment. Rather, language referring to the features and advantages is understood to mean that a specific feature, advantage, or characteristic described in connection with an embodiment is included in at least one embodiment.

Thus, discussions of the features and advantages, and similar language, throughout this specification may, but do not necessarily, refer to the same embodiment.

Furthermore, the described features, advantages, and characteristics of the disclosed systems may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

The relative terms "top", "above", "forward", "front", "side", "rear", "vertical", "horizontal", and the like as used herein are for ease of reference in the description to merely describe points of reference and are not intended to limit any particular orientation or configuration of the described subject matter.

The antenna arrays described herein are used for precision direction finding radar system application, not for communication systems, and therefore include antennas typically operating at frequencies between 0.5 GHz and 40 GHz.

Figure 2:
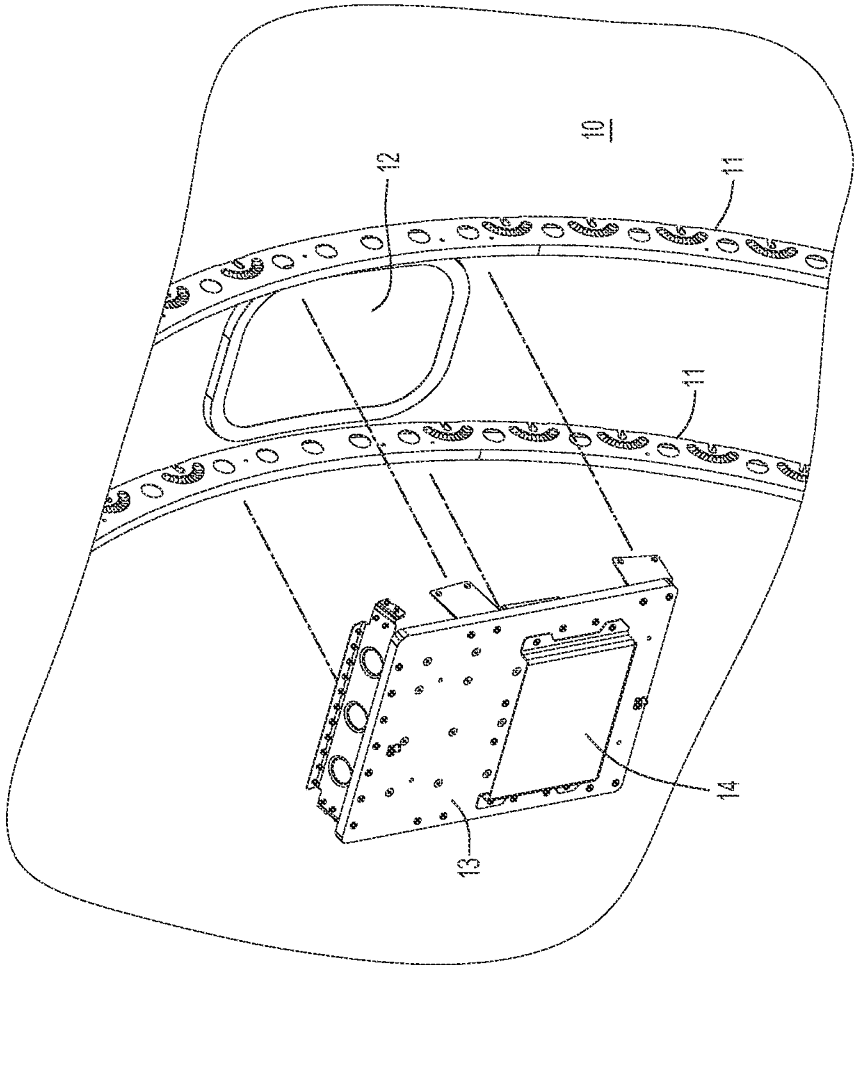
FIG. 2 is an exploded view showing the positioning of an antenna arrays of FIG. 1 at a fuselage window.
Figure 3:
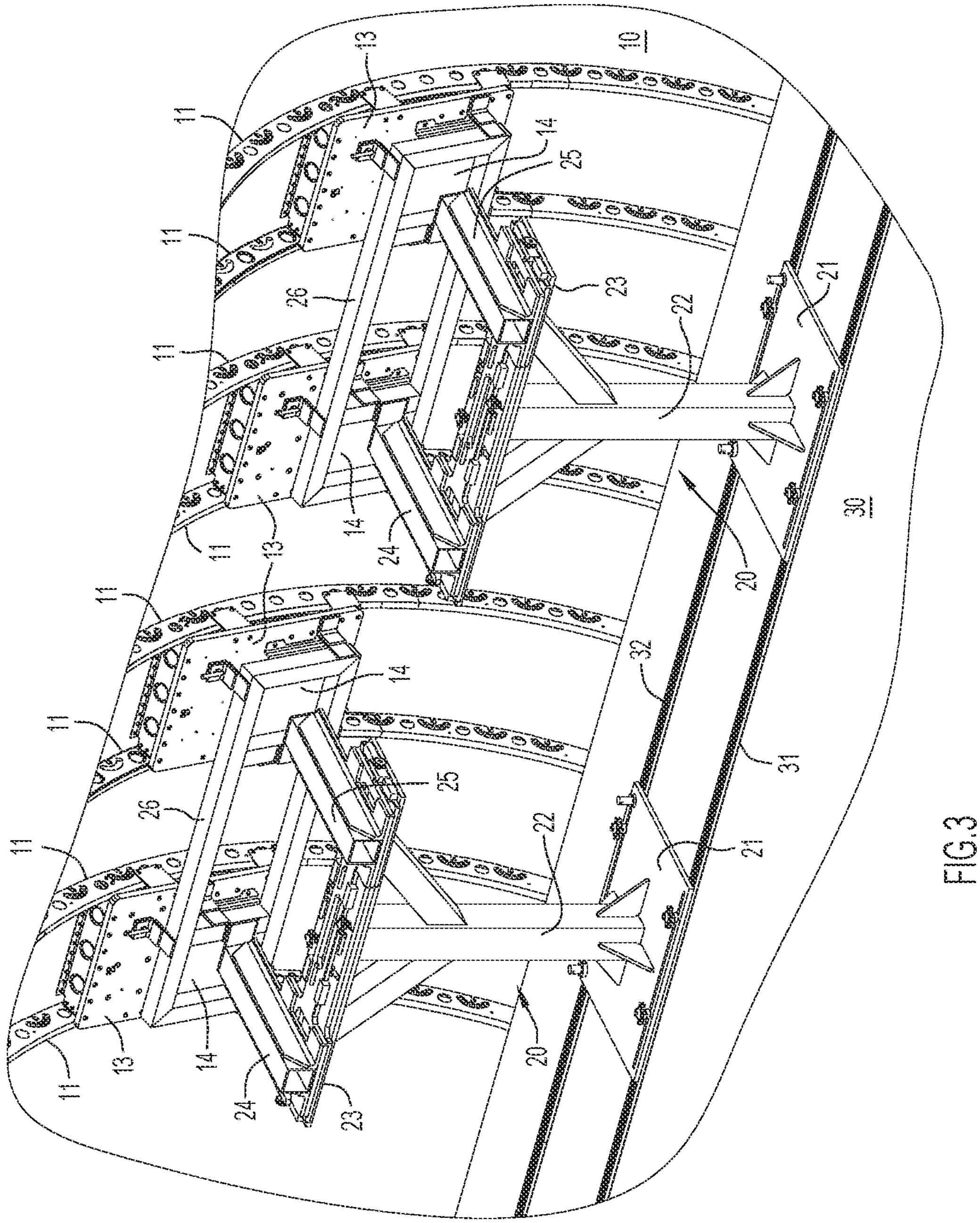
FIG. 3 is a perspective view similar to FIG. 1 but with the antenna arrays supported in pairs by two installation fixtures.
Figure 4:
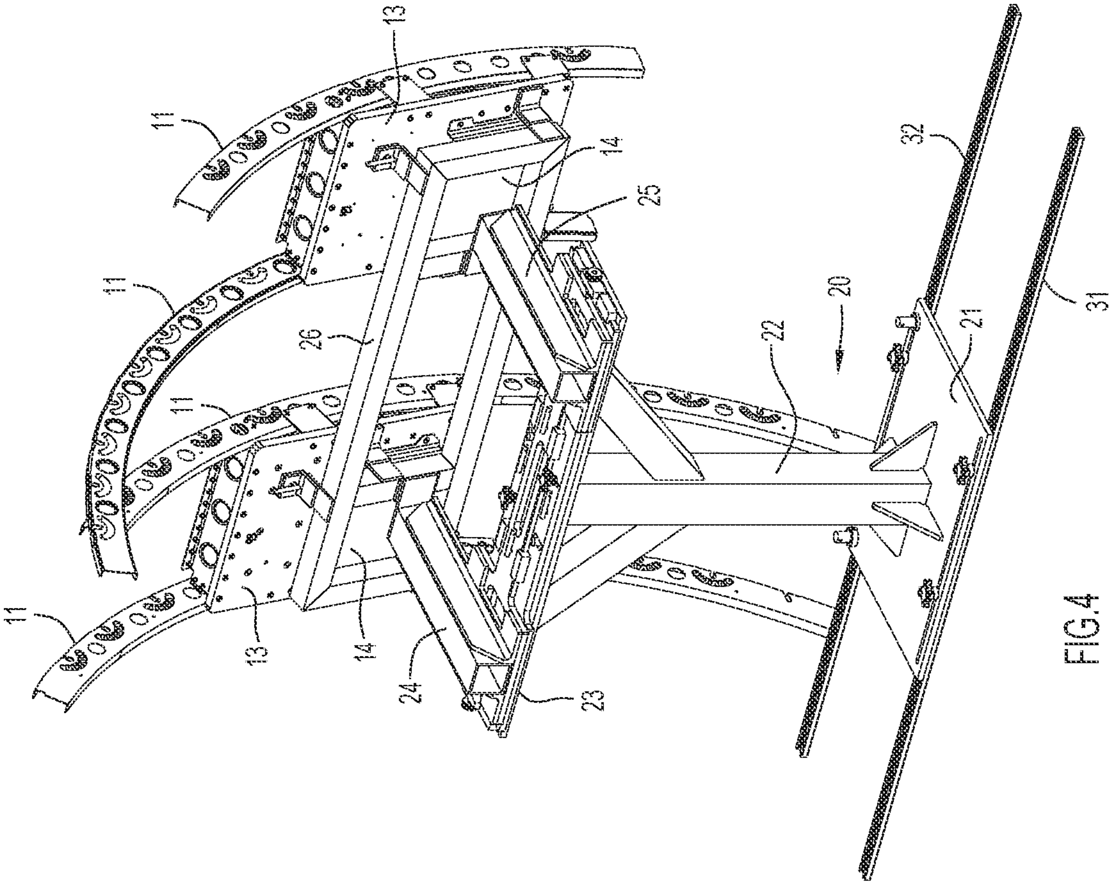
FIG. 4 is a perspective view of a portion of the fuselage wall and one installation fixture supporting two antenna arrays in place at respective windows.
Figure 5:
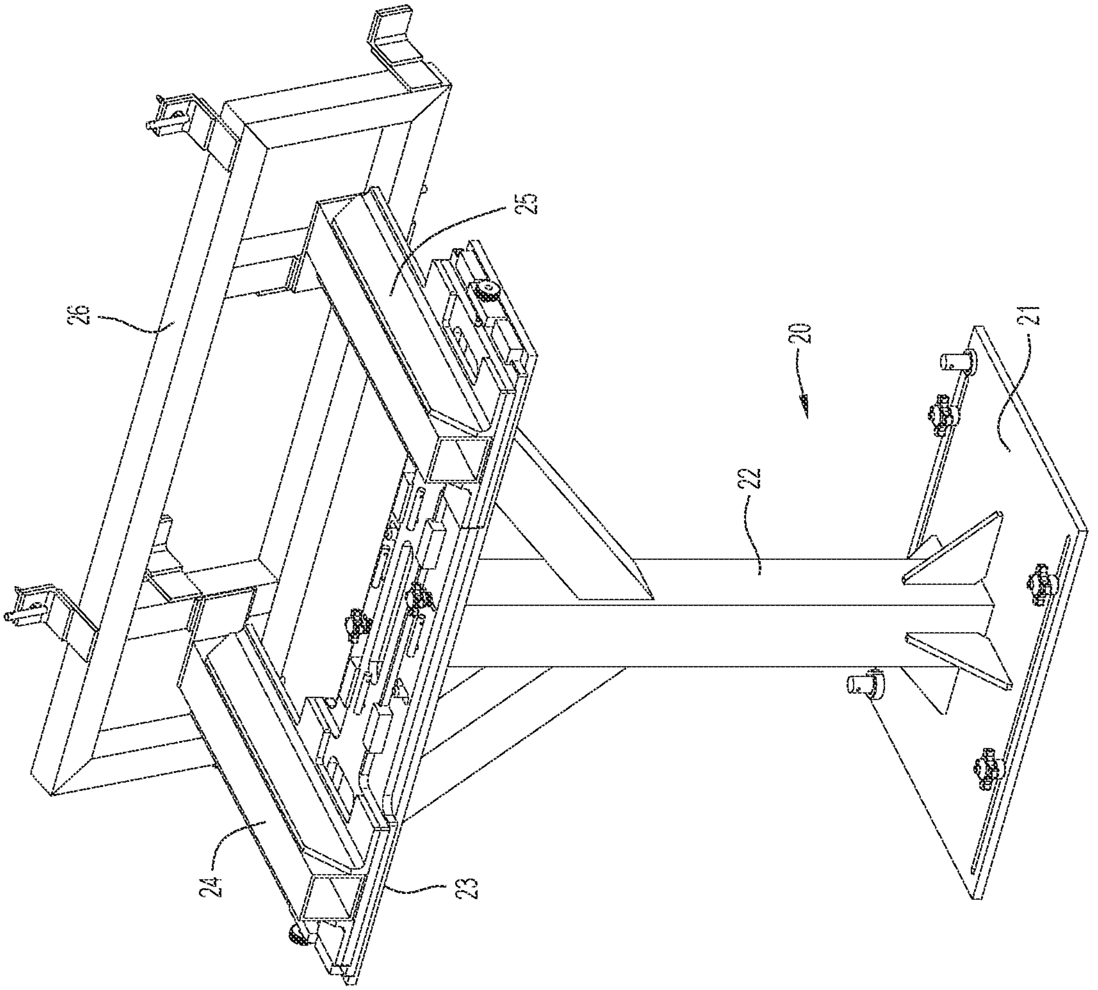
FIG. 5. is a rear view in perspective of the installation fixture of FIG. 3.
Figure 6:
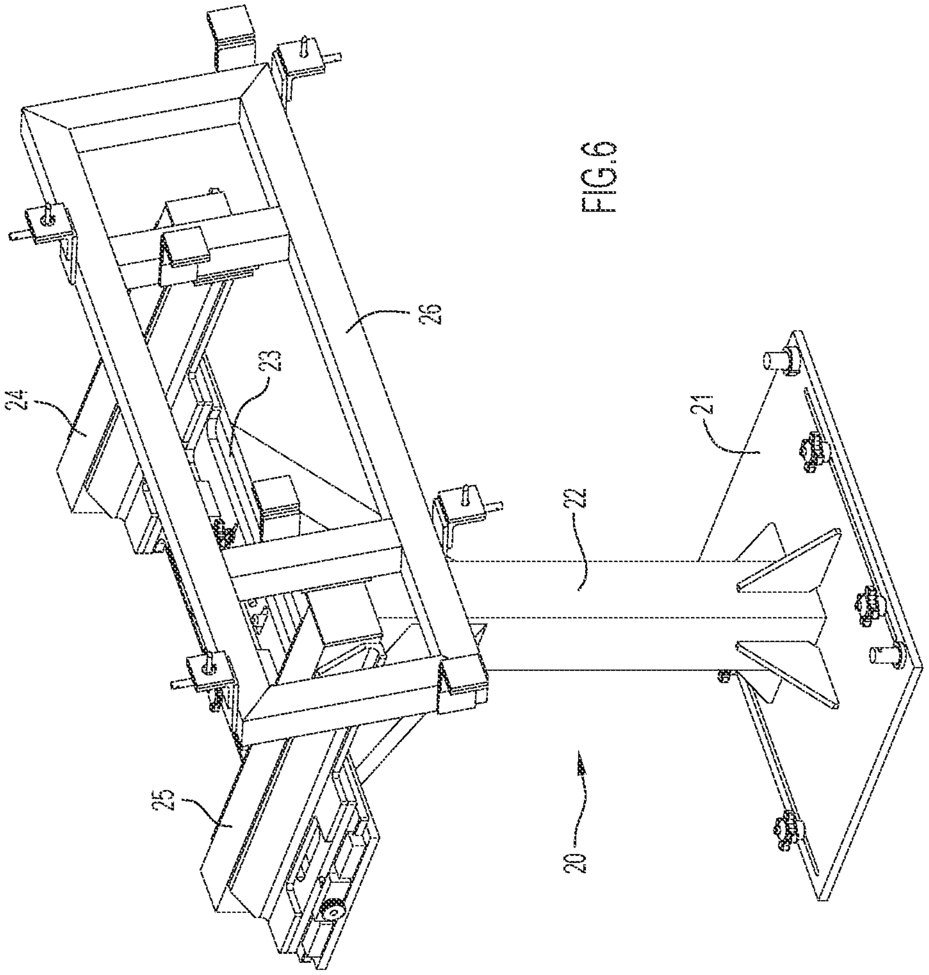
FIG. 6 is front view in perspective of the installation fixture of FIG. 4.

Referring specifically to FIGS. 1 and 2, an aircraft fuselage is structurally supported by multiple longitudinally spaced annular frame members 11 and includes an interior surface 10. Multiple windows 12, spaced longitudinally along the fuselage, are defined in the fuselage wall between respective pairs of frame members 11. A plurality of mounting panels 13 may be removably secured to and extend between respective adjacent pairs of frame members 11 over respective windows 12. Panels 13 may be secured to the frame members by means of screws, bolts, clamps, hooks, adhesive tape, or any appropriate readily removable attachment means capable of holding a panel in place over (i.e., adjacent or in front of) a window as shown without reconfiguring the aircraft. Securely mounted on each panel 13 is a module 14 housing a direction-finding antenna array. Each module is positioned on its panel 13 such that the field of view of its antenna array is through the window 12 over which that panel is positioned.

Figure 7:
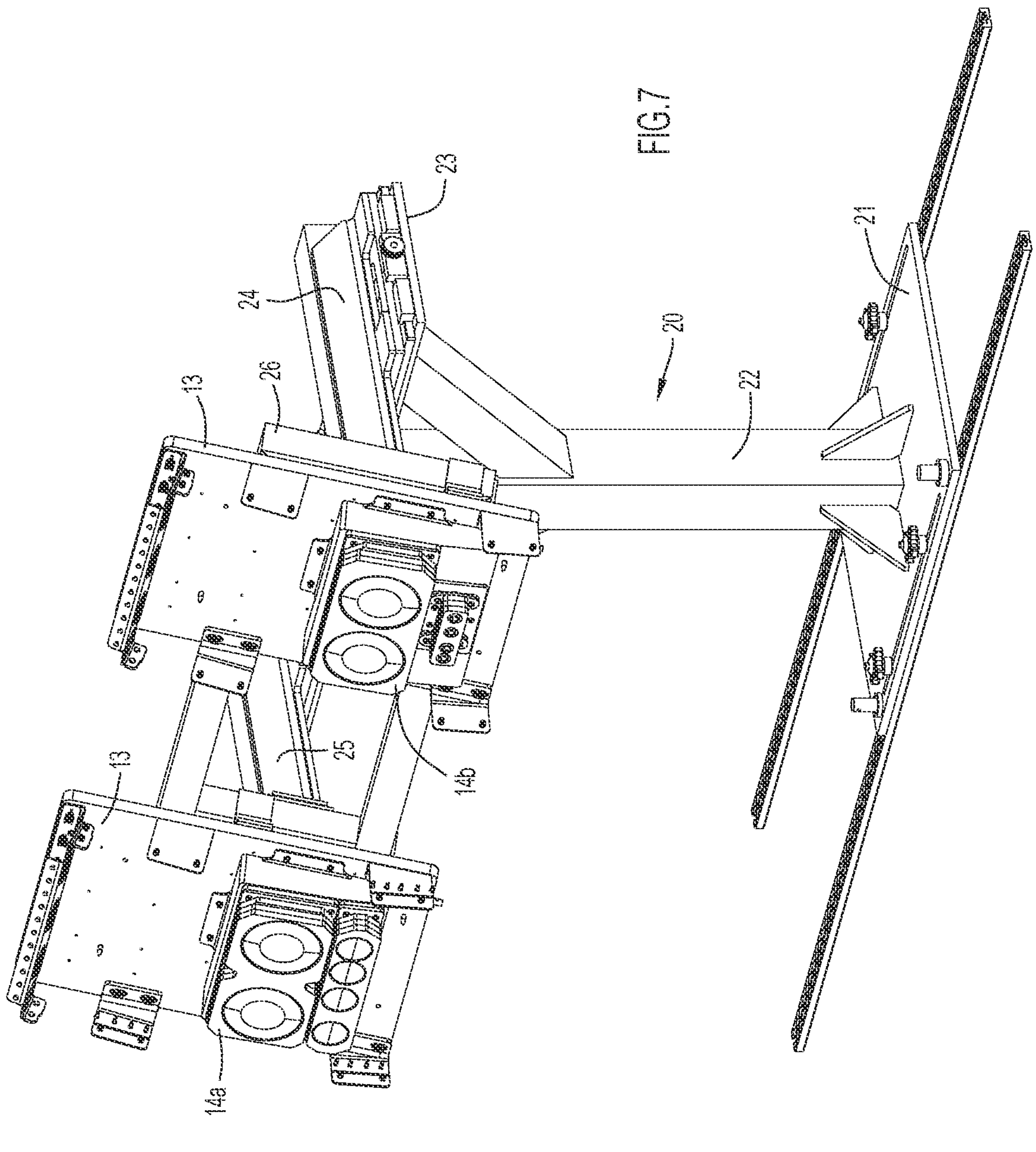
FIG. 7 is a front view in perspective of the installation fixture of FIG. 5 with two antenna arrays supported thereon.

The antennas in adjacent antenna array modules may be the same to provide separate beam patterns covering the same frequency range(s), or may differ to provide beam patterns of different frequency spectra. For example, in the left array 14*a* shown in FIG. 7, the larger antennas may cover a frequency range of 0.5 GHz to 4 GHz whereas the smaller antennas in that array may cover a frequency range of 4 GHz to 18 Ghz. On the other hand, for the antennas in array 14*b*, the larger antennas may cover a range of 0.5 GHz to 4 GHz whereas the smaller antennas in that array may cover a range of 18 GHz to 40 GHz.

Figure 8C:
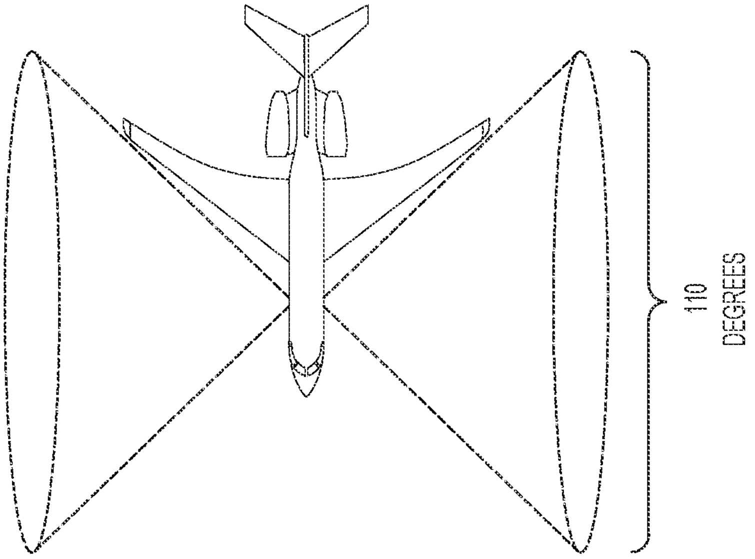
FIGS. 8A, 8B and 8C are diagrammatic illustrations of a typical beam patterns of direction-finding antenna arrays emanating from opposite side windows of an aircraft in accordance with the principles disclosed herein.
Figure 8A:
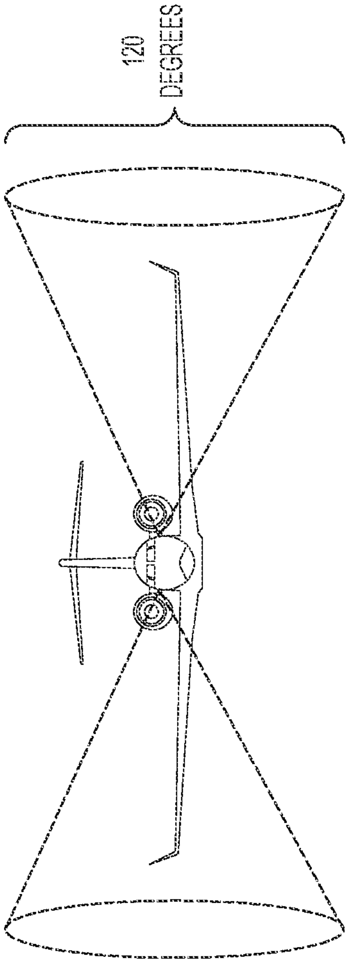
Figure 8B:
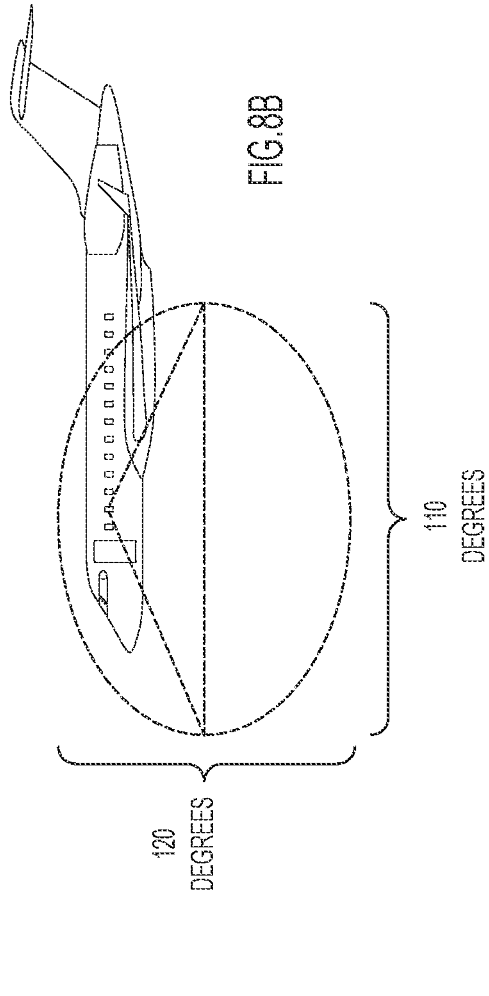

The particular fuselage, frame member and window arrangement are shown and described by way of one example only and are not intended to be limiting as to the model of aircraft or the manner of positioning the antenna arrays at the interior surface of any aircraft windows. Different arrays may be placed at different window locations around the aircraft to ensure wide coverage and a minimization of blind spots. For example, reference is made to FIGS. 8A, 8B and 8C wherein example antenna array beam patterns shown emitted from windows of an aircraft are shown from the front, side and above the aircraft, respectively.

It will be understood that the antennas may be selectively positionable in their modules 14 to permit the beam pattern emanating from their array to be redirected vertically and/or horizontally to accommodate particular direction-finding the requirements. In other words, the antenna array may be movable in at least two degrees of motion relative to the window to permit selective redirecting of the antenna array field of view through the window.

One alternative to securing support panels 13 to frame members 11 as described above and depicted in FIGS. 1 and 2 is to employ an installation fixture 20 to position the antenna arrays adjacent respective windows as illustrated in FIGS. 3-7. Installation fixture 20 includes a base plate 21 from which pedestal 22 extends vertically to support a horizontally extending platform 23. A pair of parallel elongated support arms 24, 25 may be slidably engaged on the top surface of platform 23. Specifically, arms 24, 25 have respective forward sections projecting transversely of the platform, and rearward sections that may be transversely slidable along the top surface of the platform. The forward ends of support arms 24, 25 are secured to a mounting frame 26 such that the mounting frame is suspended from arms 24, 25 at a location transversely spaced beyond the platform 23. Mounting frame 26 may be generally rectangular and configured to firmly retain a plurality of antenna array support panels 13 at horizontally spaced locations on frame 26 that correspond to the spacing between adjacent windows 12 in the aircraft fuselage. Although frame 26 is shown as having the capability of retaining two support panels 13, it is to be understood that frame 26 can be configured to retain only a single panel 13 or three or four or more such panels.

A pair of parallel spaced tracks 31, 32 are shown secured to the aircraft cabin floor 30 extending longitudinally of the fuselage. Tracks 31, 32 may be of the type that are typically installed on an aircraft cabin floor to allow passenger seats to be removably attached to the track rather than directly to the floor. Base plate 21 is configured with guide members to permit fixture 20 to be moved to different positions along tracks 31, 32 for the purpose of longitudinally positioning the fixture such that its retained support plates 13 are in longitudinal alignment with respective windows 12. When the support plates 13 are properly positioned opposite their respective windows, the base plate 21 is secured in place relative to tracks 31, 32 by screws, bolts, clamps, latches or other suitable means. The support arms 24, 25 may then be slidably extended as necessary to properly position their respective retained panels 13 in close proximity to respective windows 12, after which the support arms are secured in place on the surface of platform 23.

It will be appreciated that in some aircraft, windows 12 may be oriented at a small angle relative to vertical due to fuselage wall curvature or other orientation. Accordingly, frame 26 is oriented at a similar angle relative to vertical in order to permit its retained support panels to be placed substantially parallel and in close proximity to respective windows. This orientation angle of frame 26 may be fixed (if fixture 20 is designed for a specific aircraft) or adjustable (if the fixture is intended to be adaptable to different aircraft configurations).

It is to be understood that the antenna arrays may be movable (e.g., by tilting, sliding, etc.) relative to its mounting panel 13, or mounting frame 26 may be so movable relative to platform 23, in order to permit selective directional adjustment of the field of view of the antenna array.

Although tracks 31, 32 provide a convenient way to secure installation fixture 20 in place relative to aircraft window, some aircraft may not be provided with such tracks. For those aircraft the installation fixture, or a reasonable facsimile thereof, may be provided with other means for positionally stabilizing the fixture in place relative to the window(s). One example of such means would be temporarily securing base plate 21 to the cabin floor with bolts, screws, etc.

It is important to recognize that the direction-finding antenna arrays described herein, when deployed at a window, are not permanently attached to, are not etched or formed into, and do not comprise a structural part of that window. A primary benefit of the disclosed embodiments is that an array is easily moved into position in proximity to a window in substantially any aircraft, and just as easily removed from that position without structurally modifying the window or reconfiguring the fuselage structure.

The panels 13 that are illustrated in the accompanying drawings are relatively large and, when deployed, may block light from passing therethrough into the aircraft cabin. However, that is not to be construed as a limiting factor for the placement of the direction-finding antenna arrays described herein. The assumption behind using large panels is that there will be no need for light passage through the covered window when the antenna array is deployed. It should be recognized, however, that for some applications light passage may be desirable and the panels in such cases may be configured to be smaller than the window.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of deploying a first direction-finding antenna array in an aircraft, wherein the array has a first beam pattern establishing a field of view for the first antenna array, said method comprising positioning the first antenna array adjacent an interior surface of a first window of the aircraft such that the first beam pattern projects through the first window;

wherein the aircraft has a cabin floor and a track mounted on the cabin floor, the method further comprising:

selectively positioning an installation fixture on the track so as to be selectively positionable relative to the window;

securing the first antenna array to a first movable arm of the installation fixture; and moving the first movable arm to securely position the first antenna array adjacent the interior surface of the first window.

2. The method of claim 1 further comprising:

providing a second movable arm of the installation fixture;

securing a second antenna array to the second movable arm; and moving the second movable arm to securely position the second antenna array adjacent the interior surface of a second window of the aircraft.

3. The method of claim 2 further comprising enabling the secured first and second antenna arrays to be movable in at least two degrees of motion relative to the first and second windows, respectively, to permit selective redirecting of the fields of view of the first and second antenna arrays through the first and second windows, respectively.

4. A method of deploying a first direction-finding antenna array in an aircraft, wherein the array has a first beam pattern establishing a field of view for the first antenna array, said method comprising positioning the first antenna array adjacent an interior surface of a first window of the aircraft such that the first beam pattern projects through the first window, said method further comprising:

selectively positioning an installation fixture on the floor of the aircraft cabin so as to be selectively positionable relative to the window;

securing the first antenna array to a first movable arm of the installation fixture; and moving the first movable arm to securely position the first antenna array adjacent the interior surface of the first window.

5. The method of claim 4 further comprising:

providing a second movable arm of the installation fixture;

securing a second antenna array to the second movable arm; and moving the second movable arm to securely position the second antenna array adjacent the interior surface of a second window of the aircraft.

6. The method of claim 5 further comprising enabling the secured first and second antenna arrays to be movable in at least two degrees of motion relative to the first and second windows, respectively, to permit selective redirecting of the fields of view of the first and second antenna arrays through the first and second windows, respectively.

* * * * *